Aug. 1, 1933.  A. F. MASURY  1,920,206
SPRING SUSPENSION FOR INDIVIDUALLY SPRUNG WHEELS
Filed June 17, 1932    2 Sheets-Sheet 1
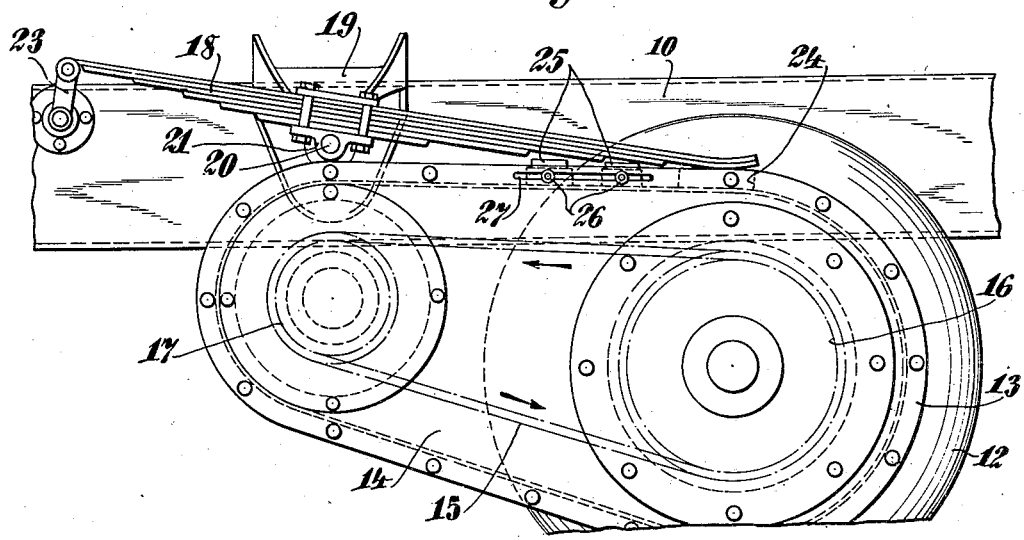
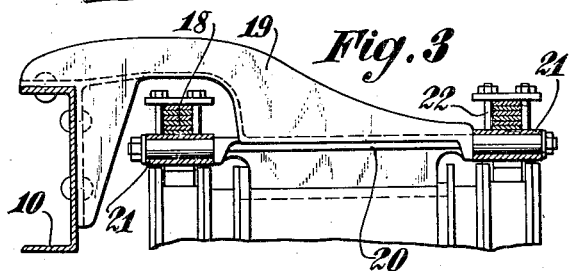
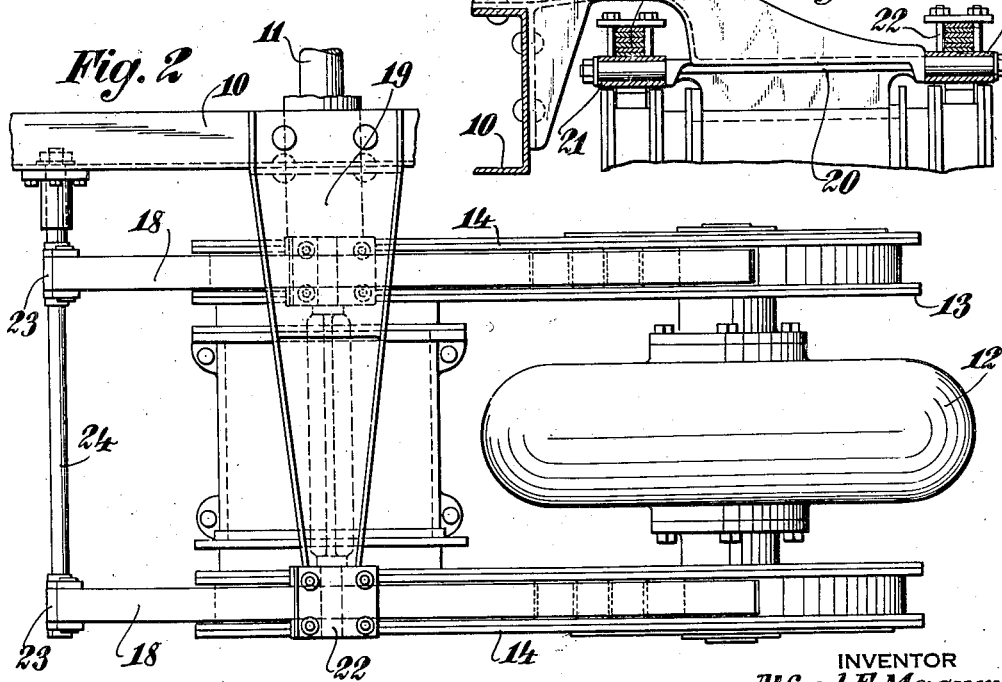
INVENTOR
Alfred F. Masury,
BY
HIS ATTORNEYS Aug. 1, 1933.  A. F. MASURY  1,920,206
SPRING SUSPENSION FOR INDIVIDUALLY SPRUNG WHEELS
Filed June 17, 1932   2 Sheets-Sheet 2

INVENTOR
Alfred F. Masury,
BY Redding, Greeley, O'Shea + Campbell
HIS ATTORNEYS

Patented Aug. 1, 1933

1,920,206

UNITED STATES PATENT OFFICE 1,920,206

SPRING SUSPENSION FOR INDIVIDUALLY SPRUNG WHEELS

Alfred F. Masury, New York, N. Y., assignor to International Motor Company, New York, N. Y., a Corporation of Delaware Application June 17, 1932. Serial No. 617,751

4 Claims. (Cl. 280—124)

The present invention relates to motor vehicles and embodies, more specifically, an improved drive and mounting for an independently mounted and sprung wheel. More particularly the invention embodies an improved mounting for an independently sprung wheel wherein the vehicle load is effectively supported upon a wheel in such fashion as to permit the same to be effectively carried thereon, whereby a desired springing action of the vehicle is obtained.

The invention further contemplates the provision of an improved form of drive for an independently sprung wheel wherein the construction is such as to afford an effective drive under adverse conditions of terrain under which the vehicle moves, the power being applied to the wheel in such fashion as to cause irregularities in the road surface to effect a change of the load center to facilitate the movement of the wheel in the desired direction.

An object of the invention, accordingly, is to provide a mounting and driving construction for an independently mounted wheel of a motor vehicle wherein the drive of the wheel under adverse conditions of terrain is improved by the shifting of the vehicle load due to the nature of the drive.

A further object of the invention is to provide an independently sprung wheel structure wherein a spring construction is provided of such character as to facilitate the movement of the wheel and the mounting structure thereof and to effectively support the vehicle load upon the wheel.

Further objects, not specifically enumerated above, will be apparent as the invention is described in greater detail in connection with the accompanying drawings, wherein:

Figure 1 is a view in side elevation showing a wheel mounting and drive and driving elements therefor constructed in accordance with the present invention.

Figure 2 is a plan view of the structure shown in Figure 1.

Figure 3 is a detail view in section, showing the mounting structure upon which the springs are secured.

Figure 4:
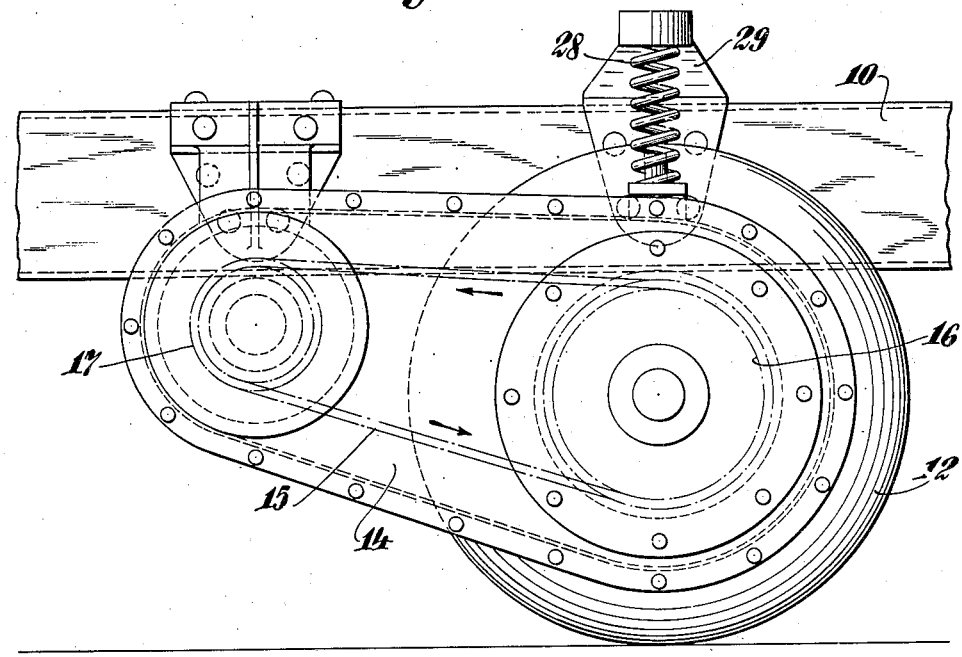
Figure 4 is a view in side elevation, showing a modified spring mounting constructed in accordance with the present invention.

With reference to the above drawings, particularly Figures 1, 2, and 3, a vehicle frame is shown at 10 and is provided with a jack shaft 11 for supplying power to a wheel 12 which is supported upon a fork-shaped mounting structure 13. The mounting structure is provided with spaced arms 14 between which the wheel 12 is journaled, each arm containing a driving chain 15 (indicated in dot and dash lines of Figure 1). The ends of the arms 14, adjacent the wheel 12 are provided with driven sprockets 16 (indicated in dot and dash lines in Figure 1) while the other ends of the arms are provided with driving sprockets 17 which are driven through a suitable driving mechanism from the shaft 11, chains 15 transmitting the power between the driving sprockets and the driven sprockets. The construction is such that the upper stretches of the chains are under tension and move in the direction of the arrow of Figure 1, the lower stretches moving in the direction indicated by the lower arrow and being slack. The tendency of the power transmitted to the wheel will be to pull the forward portion of the wheel mounting structure adjacent the shaft 11 downwardly and to raise the rear ends of the arms 14. This will tend to raise the frame upwardly adjacent the wheel and to change the position of the static load of the vehicle upwardly and forwardly, thus allowing the wheel to roll over any irregularity which might be encountered in the road surface, which irregularity is of sufficient size to cause an appreciable sudden tension in the upper stretches of the chains. In this fashion, the vehicle has the ability to back and fill since the drive is independent of any obstacle encountered by the wheel, a helping effect thus being provided in getting out of a difficult hole or rut, or over a rock.

Upon the upper surface of each arm 14, a spring 18 bears, the springs preferably being anchored intermediate their ends upon a bracket 19 which is secured to the vehicle frame 10. Bracket 19, as shown in Figure 3, is provided with a pivot shaft 20 upon which bushings 21 are journaled. Springs 18 are secured to the bushings 21 by means of clips 22 and are thus adapted to pivot intermediate their ends in response to movements of the arms 14. The springs are preferably of the inverted leaf type and are secured to the frame 10 through shackle connections 23, secured to a bar 24 which is mounted upon the frame. The other ends of spring 18 are adapted to engage the top surfaces of the arms 14, a bearing block 24 being provided on the upper surface of each arm 14 to receive the ends of the respective springs. Adjustable bearing blocks 25 may also be provided on the upper surfaces of the arms 14 and secured in position by pin connections 26 which may engage slots 27 in the arm to enable the positions of the blocks to be varied. In this fashion, as greater load comes on the frame, the shorter leaves of the springs come into play and, in cooperation with the adjustable bearing blocks 25 afford a more powerful spring connection, at the same time maintaining a desired degree of cushioning for the frame.

Figure 5:
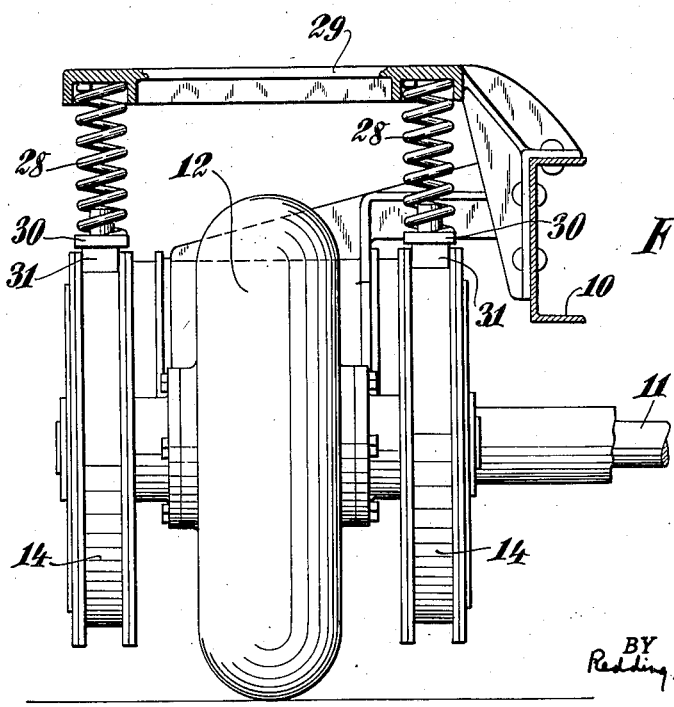
Figure 5 is a view in end elevation, looking from the right, as viewed in Figure 4, and partly in section and showing the spring construction of Figure 4.

In the construction shown in Figures 4 and 5, the arms 14 are driven in the manner outlined in the construction shown in Figures 1, 2 and 3, the spring connection between the wheel and frame being effected by means of a plurality of coil springs 28 which are secured at one end in a bracket 29 which is mounted upon the frame, and at the other ends thereof, to bearing blocks 30 which are adapted to engage bearing surfaces 31 formed upon the arms.

From the foregoing, it will be seen that an independently mounted wheel construction has been provided by means of which the vehicle load is effectively supported upon independently mounted wheels and that a drive has been provided by means of which the movement of the vehicle over irregularities in road surface is greatly facilitated.

While the invention has been described with specific reference to the accompanying drawings, it is not to be limited, save as defined in the appended claims.

I claim as my invention:

1. A vehicle having a frame, a wheel, a mounting device on the frame to mount the wheel as an independent unit on the frame, a spring on the frame, means to mount the spring on the frame to engage the top surface of the mounting device, a bearing pad on the mounting device, and means to vary the position of the pad to vary the effective length of the spring under load.

2. A vehicle having a frame, a wheel, a mounting device on the frame to mount the wheel as an independent unit on the frame, a leaf spring on the frame, and means to secure the spring to the frame independently of the device and above the said device with the longest leaf uppermost and extending downwardly to engage the device, whereby the shorter leaves come into play against the device as the load on the spring increases.

3. A vehicle having a frame, a wheel, a mounting device on the frame to mount the wheel as an independent unit on the frame, a leaf spring on the frame, means to secure the spring to the frame with the longest leaf uppermost, whereby the shorter leaves come into play as the load on the spring increases and an adjustable bearing block on the mounting device to engage a leaf of the spring coming into play under increased load.

4. A vehicle having a frame, a wheel, a mounting device on the frame to mount the wheel as an independent unit on the frame, a leaf spring on the frame, means to secure the spring to the frame with the longest leaf uppermost, whereby the shorter leaves come into play as the load on the spring increases, and bearing blocks on the mounting device to engage the leaves of the spring coming into play under increased load.

ALFRED F. MASURY.